UNITED STATES PATENT OFFICE 2,555,463

STABILIZED SODIUM PANTOTHENATE COMPOSITION

Herman H. Bogin and Rufus D. Feick, Detroit, Mich., assignors to Parke, Davis & Company, Detroit, Mich., a corporation of Michigan No Drawing. Application March 28, 1949, Serial No. 83,996

2 Claims. (Cl. 260—534)

The invention relates to the preparation of comminuted solid products in a form capable of maintaining the original physical and chemical characteristics without deterioration for extended periods of time under normal conditions of storage and marketing. More particularly, the invention is concerned with the preparation of products having medicinal value containing an ingredient which is normally hygroscopic.

Comminuted hygroscopic materials, even when carefully packaged, tend to lump or cake and thereby lose their free flowing ability. Moreover, the absorption of moisture often causes chemical decomposition.

In the present state of the art, attempts have been made to eliminate the disadvantages inherent in hygroscopic materials by mixing them with certain other ingredients such, for instance, as talc. However, there are many important materials of commerce which have not been effectively preserved and/or stabilized against decomposition by mixing with any substance heretofore suggested.

We have discovered a means whereby normally hygroscopic materials may be prepared in a stable form, resistant to deterioration either chemically or physically. Our invention consists in incorporating with the hygroscopic material, methyl cellulose or other equivalent cellulose derivative, and comminuting the mixture into powder form. The methyl cellulose in intimate mixture with the normally hygroscopic material serves to lessen its hygroscopic properties and to protect it from deterioration under normal conditions of storage and marketing.

We have found that methyl cellulose may be used as a protective ingredient with a large class of substances that heretofore have been difficult to store in ordinary containers or in capsules. For example, the alkali metal salts of pantothenic acid (a vitamin of the B-complex) are very hygroscopic but such salts are desirable in many vitamin preparations. Racemic sodium pantothenate is extremely hygroscopic under normal conditions which virtually precludes its packaging. Moreover, the adsorption of water by this material causes rapid and extensive chemical deterioration with the attendant loss of therapeutic effectiveness. The incorporation of methyl cellulose with racemic sodium pantothenate provides a product in powder form that resists both physical and chemical deterioration even in moisture laden atmospheres.

In preparing the products of this invention, the methyl cellulose and the material to be stabilized are both incorporated in a liquid vehicle to form a homogeneous mixture, preferably a solution, and the liquid vehicle is removed at temperatures below the decomposition point of the material thereby obtaining a solid product which is then comminuted into powder form. The amount of methyl cellulose to be used with a particular material depends somewhat upon the hygroscopicity of the substance. In general, it may vary from as little as 2% by weight to as high as 60% by weight but, usually, the methyl cellulose is between about 17% to 23% by weight.

The following examples are illustrative.

Example 1

Racemic sodium pantothenate is dissolved in ethyl alcohol and is added with rapid stirring to an aqueous solution of methyl cellulose. The ratio of pantothenate to methyl cellulose is 3 parts to 2 parts by weight. The solution is placed in a vacuum drier and maintained at a pressure of 3 mm. at 150° F. The dried solid residual product contains approximately 3% water, 40% methyl cellulose and 57% racemic sodium pantothenate. The residue after being reduced to powder form is substantially non-hygroscopic and may be stored for long periods of time without caking and without discoloration.

Example 2

8 oz. of an alcoholic solution containing 3.04 oz. of racemic sodium pantothenate is added with rapid stirring to a solution of 61.5 g. of methyl cellulose in 538.6 g. of water. The solution is placed in a vacuum drier and dried under a pressure of 3 mm. at 150° F. The dry residual product which contains 2.5 mg. of sodium d-pantothenate per gram is ground to a 30 mesh granulation. The finely divided product thus obtained does not cake, decompose or discolor even upon exposure to water-saturated air for a period of twenty-four hours at 50° F. and 100° F. Under similar conditions an untreated dry sample of racemic sodium pantothenate (obtained by evaporation of the alcohol from the solution used above) adsorbs moisture, cakes and becomes gummy within a few minutes.

Example 3

56 lbs. of methyl cellulose manufactured by Dow Chemical Company under the trade mark "Methocel" (19.9 C. P. S.) is soaked in 280 lbs. of boiling hot water and is stirred for one-half hour. 226 lbs. of cold water is added while stirring, giving a clear solution which is allowed to cool to room temperature. To the cooled aqueous solution is added 206 lbs. of an alcoholic solution of racemic sodium pantothenate containing about 33% solids so that 1 cc. of the alcoholic solution contains approximately .8 g. solids, of which 148.5 mg. represents the biologically active sodium d-pantothenate. The mixture is vacuum dried for sixteen to twenty hours at 150° F. under a pressure of 2–4 mm. The dried solid material is reduced to No. 20 granulation in a suitable mill thereby obtaining a dry granulation. The moisture content in the final product is approximately 2% and it is desirable that it should always be maintained less than 4%. The final solid granulation assays 256 mg. per gram of the biologically active sodium d-pantothenate. Material prepared as above is suitable for marketing in ordinary gelatin capsules and it may be stored for long periods of time without caking and without discoloration. The sodium pantothenate prepared in accordance with this example may also be mixed with other solid therapeutic products such, for example, as compounds having other vitamin activity.

*Example 4*

12 g. of racemic sodium pantothenate is dissolved in 36 g. of ethyl alcohol and this is added with rapid stirring to a solution of 10 g. of sodium carboxymethyl cellulose in 90 cc. of water. The solution is placed in a vacuum drier and dried under a pressure of 2 mm. at 150–160° F. The dry residual product is ground to 30 mesh granulation. The finely divided product thus obtained does not cake, decompose or discolor under normal conditions nor even upon exposure to water saturated air for a period of 24 hours at 50° F. Under similar conditions an untreated dry sample of racemic sodium pantothenate adsorbs moisture, cakes and becomes gummy within a few minutes.

The above examples are representative of stabilized medicinal preparations which may be obtained in accordance with this invention and which include active medicinal ingredients which are normally hygroscopic.

Our invention in its broader aspects consists in a solid product which, in powdered form, is resistant to adsorption of moisture although it contains as one of its ingredients, a normally hygroscopic material. The ingredient which imparts these desirable properties is preferably methyl cellulose but other equivalent cellulose derivatives may also be used in lieu thereof such, for example, as sodium carboxymethyl cellulose.

What we claim as our invention is:

1. A dry, stable, solid, non-hygroscopic granulated product comprising an intimate mixture of normally hygroscopic sodium pantothenate and 2 to 60% by weight of a cellulose derivative of the class consisting of methyl cellulose and an alkali metal salt of carboxymethyl cellulose.

2. A dry, stable, solid, non-hygroscopic granulated product comprising an intimate mixture of normally hygroscopic sodium pantothenate and 2 to 60% by weight of methyl cellulose.

HERMAN H. BOGIN.
RUFUS D. FEICK.

REFERENCES CITED

The following references are of record in the file of this patent:

UNITED STATES PATENTS

| Number | Name | Date |
| --- | --- | --- |
| 2,362,761 | Medl | Nov. 14, 1944 |
| 2,367,791 | Parke et al. | Jan. 23, 1945 |
| 2,410,110 | Taylor | Oct. 29, 1946 |
| 2,442,143 | Pickel et al. | May 25, 1948 |
| 2,484,637 | Mattocks et al. | Oct. 11, 1949 |

OTHER REFERENCES

Mattocks et al., J. Am. Pharm. Assoc., Sci. ed., pp. 275–279, September 1946.